(No Model.) 3 Sheets—Sheet 1.
C. GREENE.
PLANT FOR PREPARING PAVING MATERIALS.
No. 591,839. Patented Oct. 19, 1897.

Witnesses
Inventor
Carleton Greene
Attorneys (No Model.) 3 Sheets—Sheet 2.

C. GREENE.
PLANT FOR PREPARING PAVING MATERIALS.

No. 591,839. Patented Oct. 19, 1897.

Witnesses
Inventor
Carleton Greene (No Model.) 3 Sheets—Sheet 3.

C. GREENE.
PLANT FOR PREPARING PAVING MATERIALS.

No. 591,839. Patented Oct. 19, 1897.

Witnesses
Inventor
Carleton Greene
by Foster Freeman
Attorneys

UNITED STATES PATENT OFFICE.

CARLETON GREENE, OF BUFFALO, NEW YORK, ASSIGNOR TO THE BARBER ASPHALT PAVING COMPANY, OF WASHINGTON, DISTRICT OF COLUMBIA, AND NEW YORK, N. Y.

PLANT FOR PREPARING PAVING MATERIALS.

SPECIFICATION forming part of Letters Patent No. 591,839, dated October 19, 1897.

Application filed March 30, 1896. Serial No. 585,457. (No model.)

*To all whom it may concern:*

Be it known that I, CARLETON GREENE, a citizen of the United States, residing at Buffalo, in the county of Erie and State of New York, have invented certain new and useful Improvements in Plants for Preparing Paving Materials, of which the following is a specification.

My invention relates to portable apparatus for preparing paving material, in which two platforms—as, for instance, the platforms of two cars or the equivalent platforms of two canal-boats—carry part of the apparatus and an intermediate platform movably connected to and supported upon one of the cars carries another portion of the apparatus; and my invention consists in constructing and arranging the parts, as fully set forth hereinafter, and as illustrated in the accompanying drawings, in which—

Figure 1:
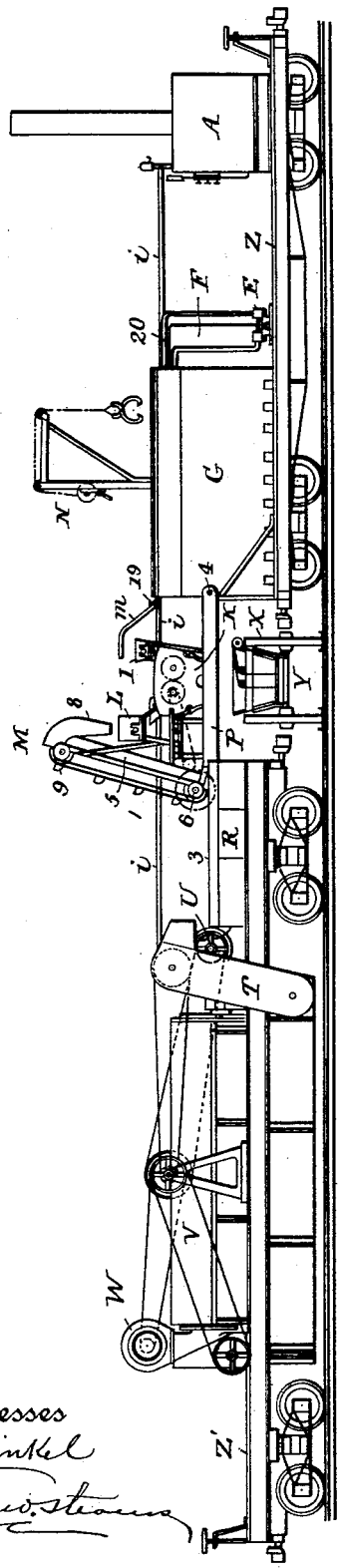
Figure 2:
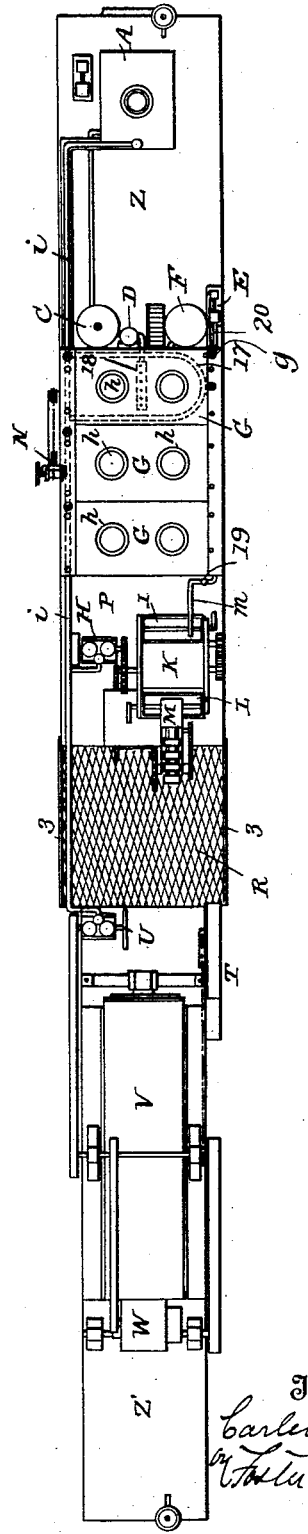
Figure 3:
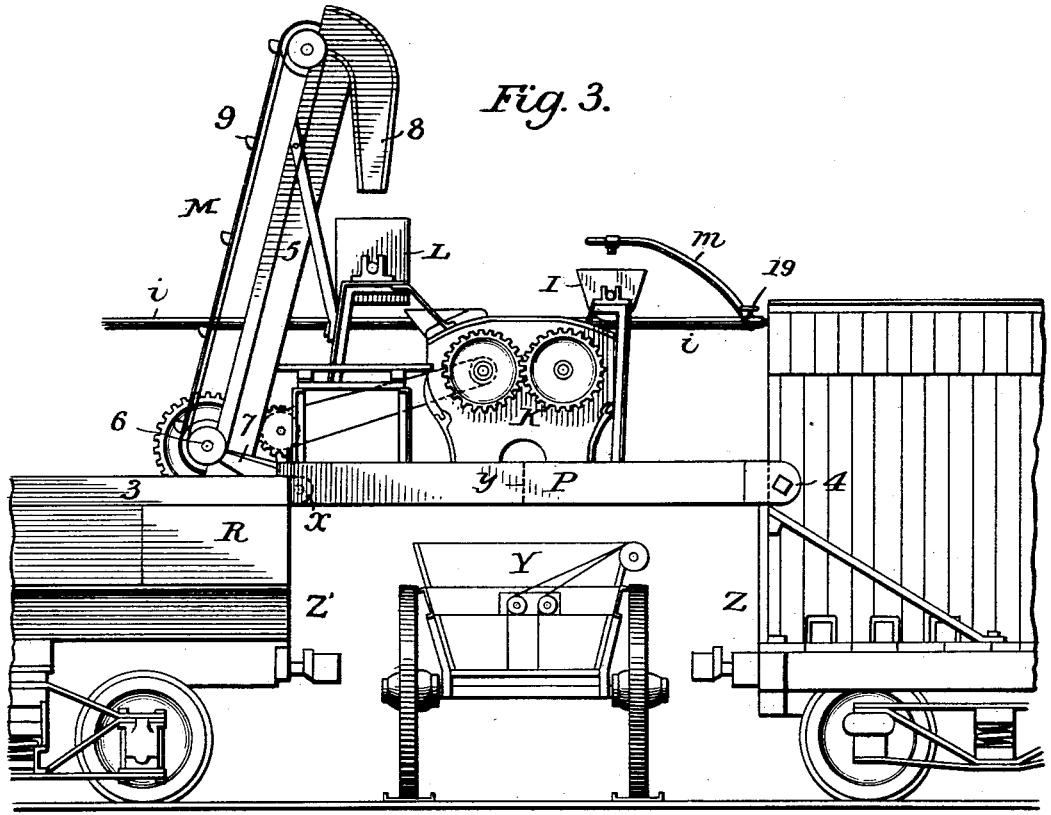
Figure 4:
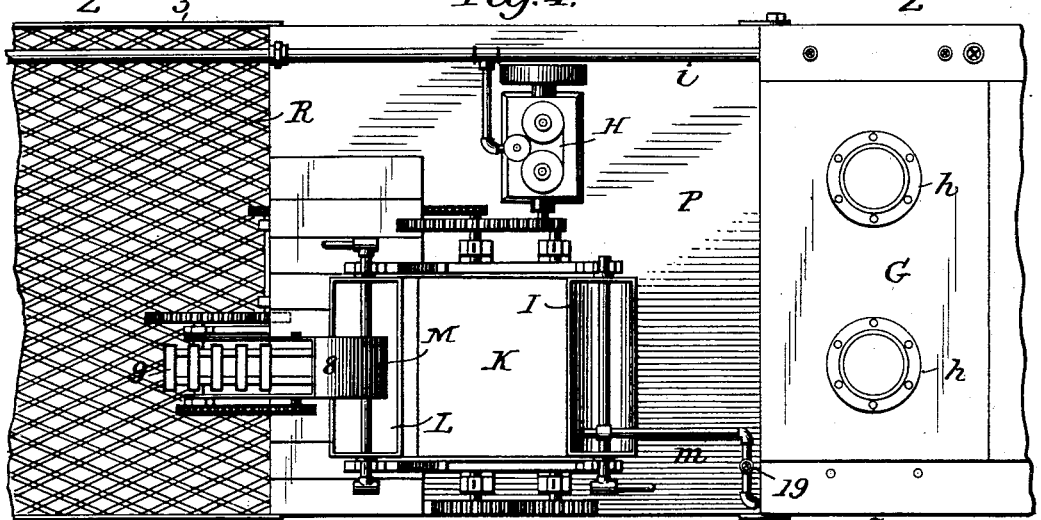
Figure 5:
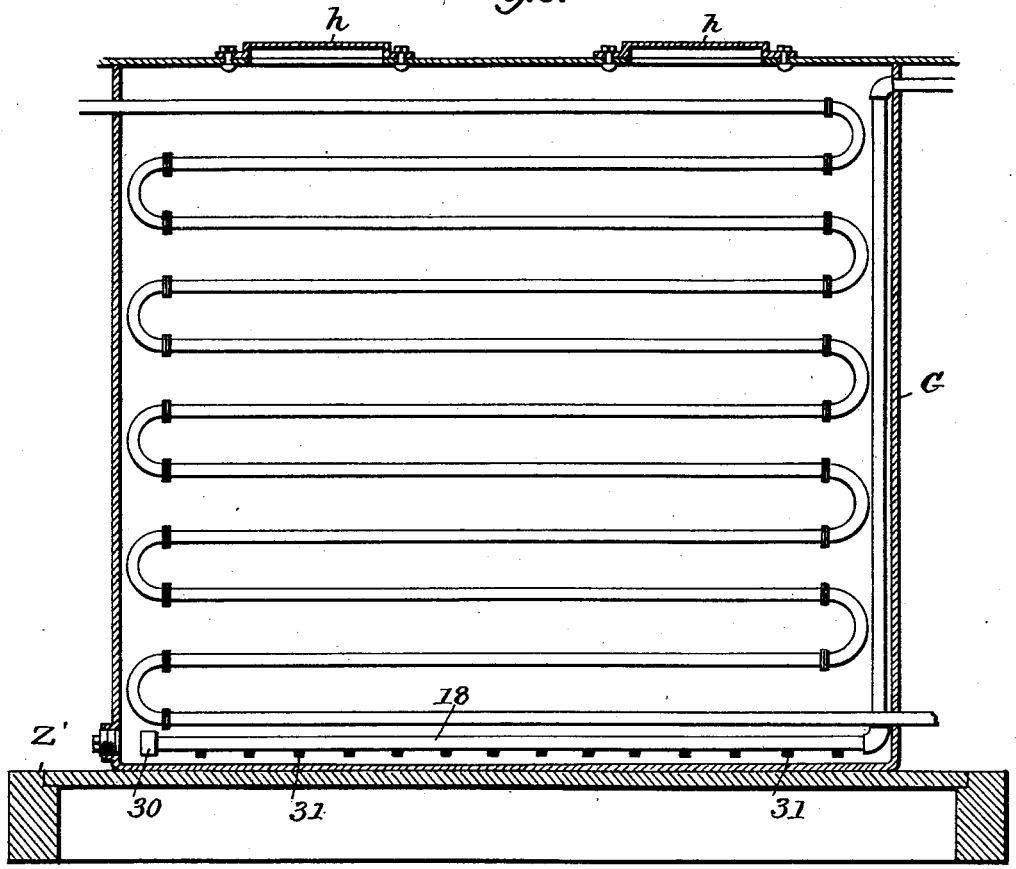
Figure 6:
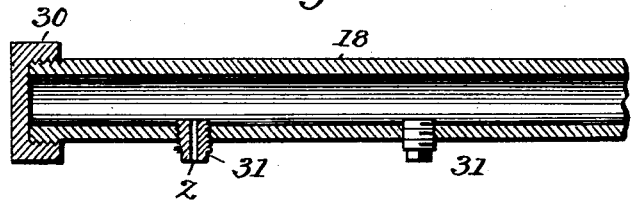

Figure 1 is a longitudinal elevation of my improved apparatus as arranged for use. Fig. 2 is a plan view of Fig. 1. Fig. 3 is an enlarged elevation showing, mainly, the intermediate elevated platform and its adjuncts. Fig. 4 is a plan of Fig. 3, and Fig. 5 is a section through one of the melting-tanks; Fig. 6, an enlarged detail of air-pipe and plug.

The parts of the apparatus are mounted upon two platform-cars Z Z', which may be of any suitable construction, and upon a supplemental platform P, which, as shown, is connected with one of the cars, but movable thereon, preferably sliding thereon upon ways at such an elevation that, when the supplemental platform is carried to its extended position, it will constitute a bridge between the two cars beneath which a cart or truck X can pass. As shown, the platform P normally rests upon the top of a hollow sand-box R between two side flanges 3 3, and is bolted in place during transportation and when the cars Z Z' are coupled; but when the apparatus is to be put in operation, the forward end of the platform P is bolted to a part of the car Z—for instance, by means of perforated ears 4—the cars are uncoupled and the car Z moves forward until the platform P is almost wholly withdrawn from the car Z' and in the position shown in Fig. 1 to permit the ready passage of a cart or truck thereunder. When the apparatus is again to be removed to another place, the platform P is carried back to its first position as the cars are brought together and coupled. While I prefer to connect the movable platform P to the car which carries it so that it will slide, it may have any other suitable movable connection. For instance, it may be pivoted at the point $x$, so as to swing over vertically to the position shown in Fig. 3, or it may be in two sections divided at the line $y$, one section carried by the car Z and the other carried by the car Z', and when the sections are pivoted, one is pivoted at $x$ and the other at 4. In any case, the supplemental platform, in one or two sections, is movably connected with the supporting car or cars, so that it may be carried into position upon the cars for transportation, and extended to form an elevated bridge when the apparatus is in use, and upon the platform is permanently secured any devices which it is desirable to have it support.

Preferably, and as shown, the devices supported by the platform P are the concrete-mixer K, of any suitable construction, and a frame having bearings for the trunnions of a swinging sand-bucket L, and of an asphalt-bucket 1, so arranged that either bucket may be swung upon its trunnions to dump the contents into the mixer. The platform P also supports a sand-elevator M, of suitable construction, shown as a frame 5, swinging about a shaft 6, supported by brackets 7, and carrying a chute 8, and with a chain of buckets 9, by which the sand is raised from the top of the sand-box R and dumped into the chute 8, from which it passes into the sand-bucket L. During transportation the elevator may be swung down to a horizontal position. The buckets L 1 may be turned over by hand or through the medium of suitable appliances.

The car Z carries another portion of the apparatus—for instance, the boiler or steam-generator A, of any suitable construction, the melting tank or tanks G, in which is heated or melted the asphalt, coal-tar, or other like material by heat applied in any suitable manner, and the apparatus for supplying said tanks with material and discharging the melted asphalt therefrom, and the means for reducing the asphalt to its proper condition. As shown, there are three separate tanks arranged in line, each with one or more manholes, each provided with a cover $h$, which may be bolted in place, so that the tank may be sealed air-tight, and with a steam-pipe $i$, passing from the generator A, communicates a pipe or series of pipes forming a steam-heating coil 17, arranged within each tank, so as to heat by its contact the asphalt which is deposited in the tank through the manhole, the blocks of asphalt being lifted by means of a crane N, carried by the car, provided with suitable tackle and grapple, and capable of being elevated to a position above the tanks or lowered during transportion.

I have found that the melting of the asphalt, and also its admixture with other substances, may be facilitated by forcing air through the body of melted material. This may be done in any suitable manner—as, for instance, by means of an air-pump D, communicating directly with a perforated pipe 18, arranged within a tank or communicating with an air-receiver C, into which the air is forced by the pump, and from which the air is carried to the pipe 18. In either case, the air which passes through the pipe 18 accumulates under pressure in the tank above the surface of the melted asphalt, and upon the opening of a cock or valve 19 in a pipe $m$, extending to and communicating with each of the tanks, forces the asphalt through the pipe, the end of which is above the bucket 1, into which the asphalt is received.

As shown in Fig. 5, the pipe 18 has a cap 30 at the end, which may be removed to facilitate cleaning. The air-openings $z$ direct the air downward, thereby agitating the material at the bottom and preventing any accumulation of sediment at the bottom. Preferably the openings are in detachable screw-plugs 31 with angular heads, so as to be readily removed to facilitate cleaning the openings should they become clogged. It is desirable in some instances to combine other materials with the asphalt during or after it has become melted, and when these materials are in a liquid state, they are placed in tanks upon the platform of the car Z, and thence pumped into the tank or tanks G. Thus in most instances the residuum of coal-oil is mixed with the asphalt, and such residuum is deposited in a tank F, from which it is pumped by a pump E through a pipe 20, supplied with a valve $g$.

The car Z' carries the sand and the means for drying, conveying, and, if desired, for mixing the same with other materials. The sand-drier consists of any of the usual constructions not necessary to be shown. A blast of air, which may be heated, if desired, is driven through the drier by means of a blast-fan W, and the sand after being dried is delivered into the bottom of a receiver 21, from which it is lifted by a chain-elevator T and delivered onto the platform at the top of the sand-box R. The sand-box R, as before stated, is hollow, communicates with the steam-pipe $i$, and is thereby heated, so as to maintain the sand above the same in a heated condition, and if cement or other material is to be combined with the sand, they may be mixed together upon the sand-platform. Suitable engines may be arranged upon the cars at different points to operate the different appliances thereon, the said engines being supplied with motor fluid from the pipe $i$. This motor fluid may be steam, or, where the effects of condensation must be avoided, the motor fluid may be air from the tank C. As shown, an engine H is geared to drive the shaft of the mixer K and the elevator M and an engine U imparts movement through suitable shafts, pulleys, and belts to parts of the sand-drier, the blower W, and elevator T.

While I have illustrated and described certain parts of the apparatus as being arranged upon the platforms of the cars and on the supplemental platform, it will be evident that some of these parts may be transposed and differently arranged. It is preferable, however, to arrange the mixer upon the elevated supplemental platform, as thereby the mixed material in condition for application to the street may be discharged directly into the cart or truck below.

Without limiting myself to the precise construction and arrangement of parts shown, I claim as my invention—

1. In a portable plant for preparing paving material, the combination with two cars supporting parts of the apparatus, of a platform movably connected to and supported by one of the cars for transportation, and supporting other parts of the apparatus, said platform, jointly with its apparatus, adapted to be extended from the end of its supporting-car across a space to the end of the other car and to be detachably connected thereto to form an elevated bridge between the cars when the apparatus is in position for use, substantially as described.

2. In a portable plant for preparing paving material, the combination with two cars supporting parts of the apparatus, of a platform supported by one of the cars for transportation and supporting other parts of the apparatus, said platform, jointly with its apparatus, adapted to slide upon its supporting-car and be extended beyond the end thereof across a space to the end of the other car, and to be detachably connected thereto to form an elevated bridge between the cars when the apparatus is in position for use, substantially as described.

3. In a portable plant for preparing paving material, the combination with two cars supporting parts of the apparatus, of a platform having other parts of the apparatus permanently secured thereto, said platform being connected to and supported by the adjacent ends of the cars when the latter are separated to form an elevated bridge between them, and the platform and apparatus thereon being together movable to permit the cars to be coupled, substantially as described.

4. In a portable plant for preparing paving material, the combination with two cars, each of which carries parts of the apparatus for preparing the ingredients of the paving material, of a movable platform detachably connected to and supported by the ends of the cars when the latter are separated, to form an elevated bridge between them, said platform having the mixing apparatus secured thereto to be moved therewith, and devices to elevate the ingredients of the paving material and discharge them into the mixing apparatus, substantially as described.

5. In an apparatus for preparing paving material, an air-tight tank to contain the asphalt, suitable heating devices to melt said asphalt, an air-pipe within the tank near the bottom thereof and having openings to direct the air downward, a device to force air through said pipe to the bottom of the tank, thence upward through the asphalt to accumulate under pressure in the tank above the asphalt, and a pipe leading from the tank through which the melted asphalt is discharged by the air-pressure in the tank, substantially as described.

6. In an apparatus for preparing paving materials, the combination with an air-tight tank in which the asphalt is melted, of an air-pipe within the tank near the bottom thereof, a series of detachable screw-plugs extending from the pipe, said plugs having openings through which the air is discharged, and a device to force air through said pipe, substantially as and for the purpose specified.

7. In a portable apparatus for preparing paving material, the combination with a platform-car, of a sand-drier supporter on the top of the platform, a receiver supported beneath the platform into which the dried sand is delivered from the drier, a hollow sand-box R also supported on top of the platform, means to heat the said sand-box, and an elevator to convey the dried sand from the receiver below the car to the sand-box R, substantially as described.

In testimony whereof I have signed my name to this specification in the presence of two subscribing witnesses.

CARLETON GREENE.

Witnesses:
 C. S. DRURY,
 CHARLES E. FOSTER.